Figure 1:
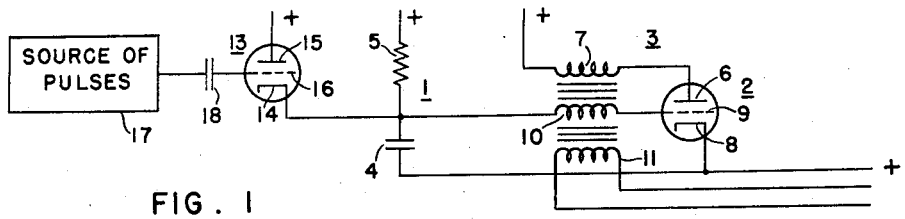

Feb. 14, 1950   J. A. KRUMHANSL   2,497,411
PULSE TRANSMISSION SYSTEM
Filed July 25, 1946   5 Sheets-Sheet 1

INVENTORS
JAMES A. KRUMHANSL
BY J. L. Bowes
ATTORNEY

Feb. 14, 1950   J. A. KRUMHANSL   2,497,411
PULSE TRANSMISSION SYSTEM

Filed July 25, 1946   5 Sheets-Sheet 2

*INVENTORS*
JAMES A. KRUMHANSL
BY
*J. L. Bower*
ATTORNEY

Patented Feb. 14, 1950

2,497,411

UNITED STATES PATENT OFFICE 2,497,411

PULSE TRANSMISSION SYSTEM

James A. Krumhansl, Rochester, N. Y., assignor to Stromberg-Carlson Company, a corporation of New York Application July 25, 1946, Serial No. 686,139

8 Claims. (Cl. 179—15)

This invention relates to systems of radio communication and more particularly to such systems in which intelligence is communicated by means of discrete pulses of radio frequency energy.

It has been proposed heretofore to transmit intelligence in the form of a train of pulses spaced apart or coded according to a function of time, as well as a function of the amplitude of a modulating voltage representing intelligence to be transmitted.

It is one of the objects of the present invention to provide new and improved apparatus for use in communication systems of the foregoing type.

It is another object of this invention to provide new and improved means for time modulating a train of pulses in communication systems.

In accordance with this phase of the invention, there is provided a source of recurring voltage which normally varies periodically with respect to time, such as a blocking oscillator, for example. The voltage source is caused to produce output pulses at times varying with the amplitude of a voltage wave representing the intelligence to be transmitted, i. e., pulse time modulation. In the receiver, demodulating means is provided to reproduce the original intelligence. Reference pulses may be transmitted for control and timing purposes in which case the receiving means employs means for separating the reference and intelligence conveying pulses into series of pulses representing the respective sources. The demodulating means is utilized to produce a recurring voltage varying in amplitude according to the time intervals between signal pulses and adjacent reference pulses, whether preceding or following the signal pulses. Envelope detecting means responsive to such voltage is employed substantially to reproduce the voltage representing the original intelligence by a sampling process.

Conventional radio communication systems are based on the selection of one of a plurality of different signal channels on a frequency selection basis. It has been proposed to transmit a plurality of signals on one band of frequencies and utilize signal selection means at the receiver.

It is another object of this invention to provide a new and improved system of this type and especially to provide means for modulating the signals utilized in such a system.

In accordance with the last mentioned phase of this invention, several audio signals are utilized to provide relatively short duration pulses which are transmitted without mutual interference by interspersing the pulses representing the different signals. Reference pulses may be used to synchronize transmitter and receiver.

Figure 2:
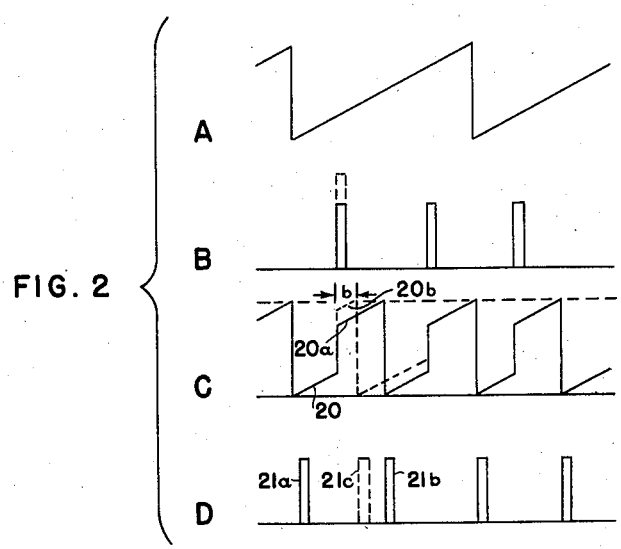
Figure 3:
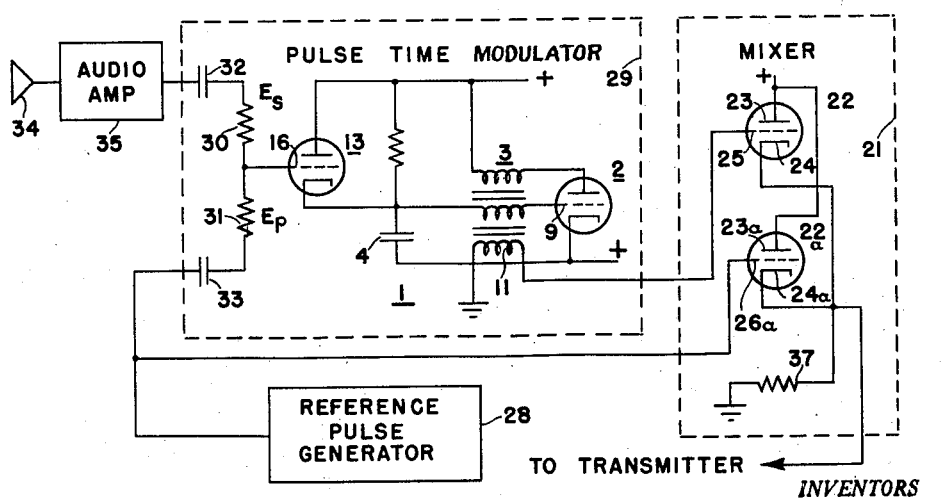
Figure 4:
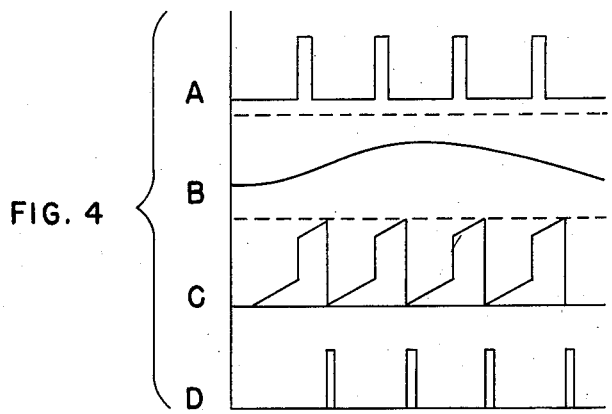
Figure 5:
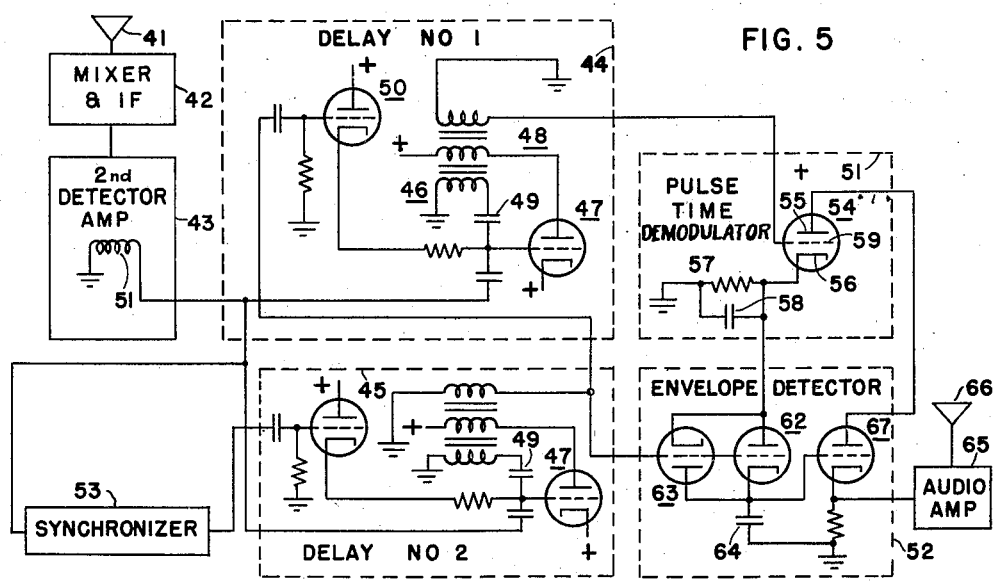
Figure 6:
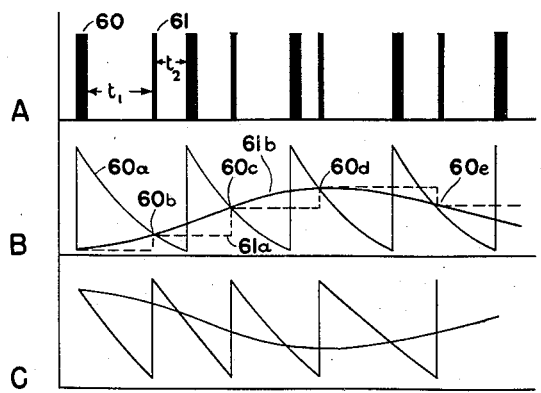
Figure 7:
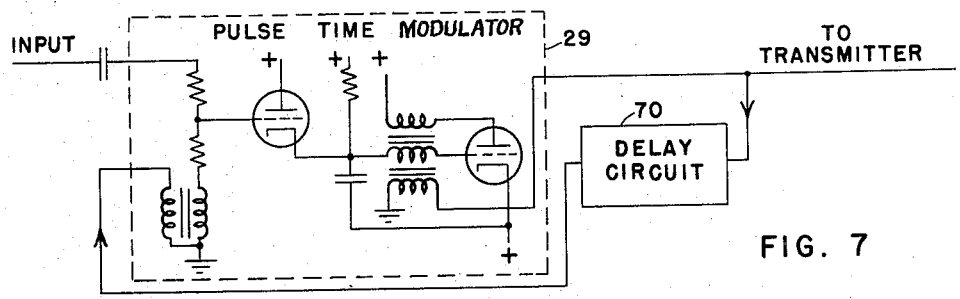
Figure 8:
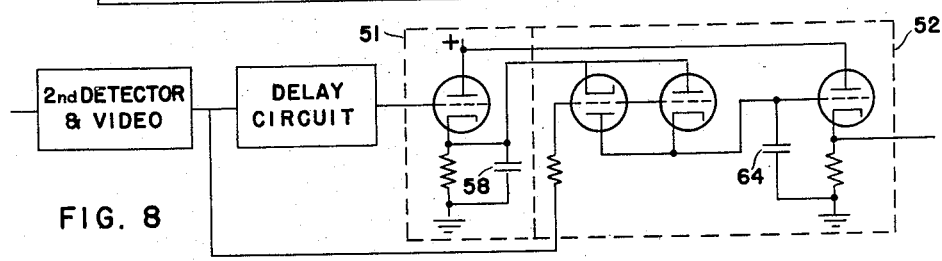
Figure 9:
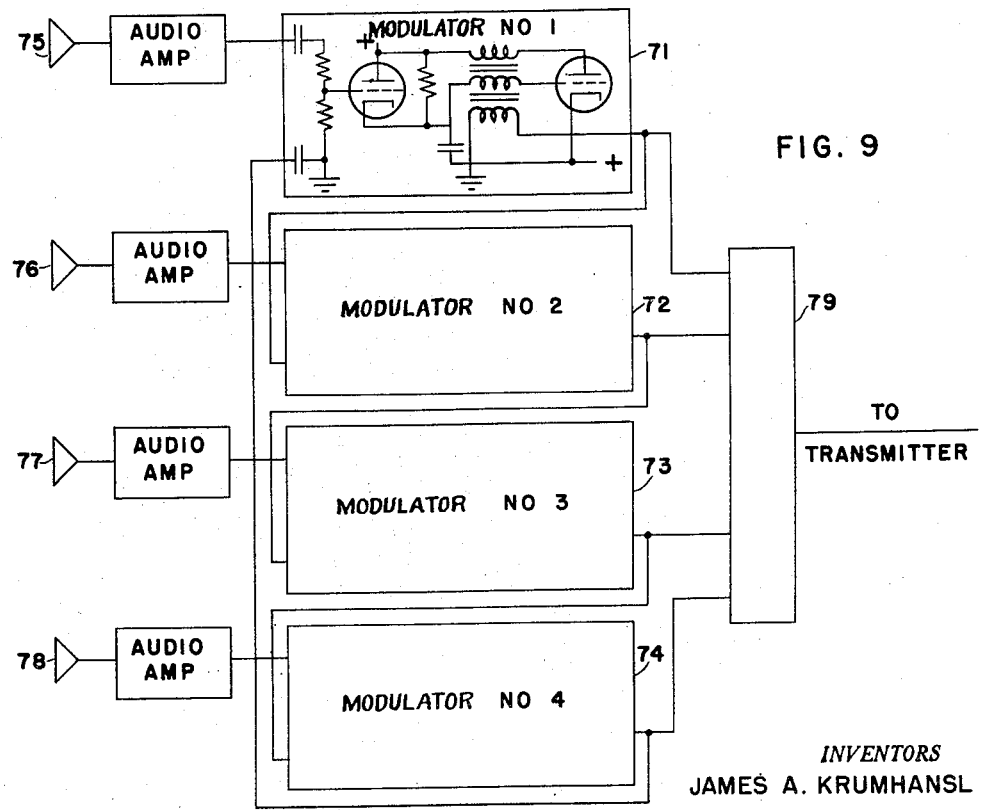
Figure 10:
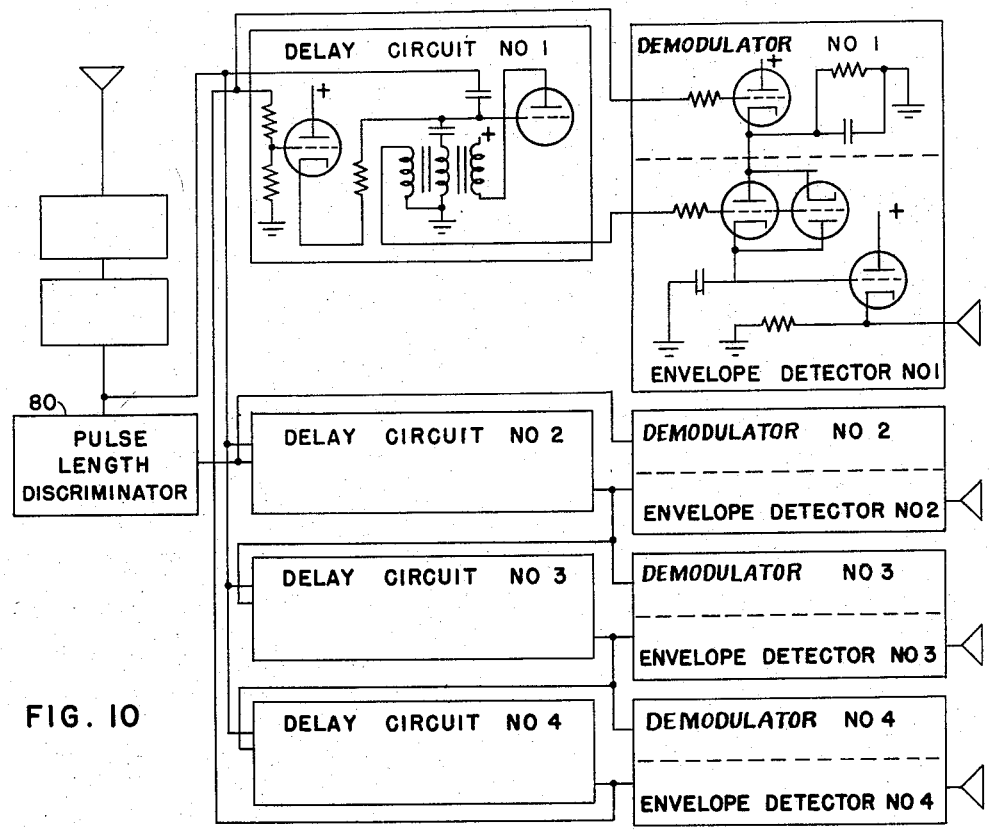
Figure 11:
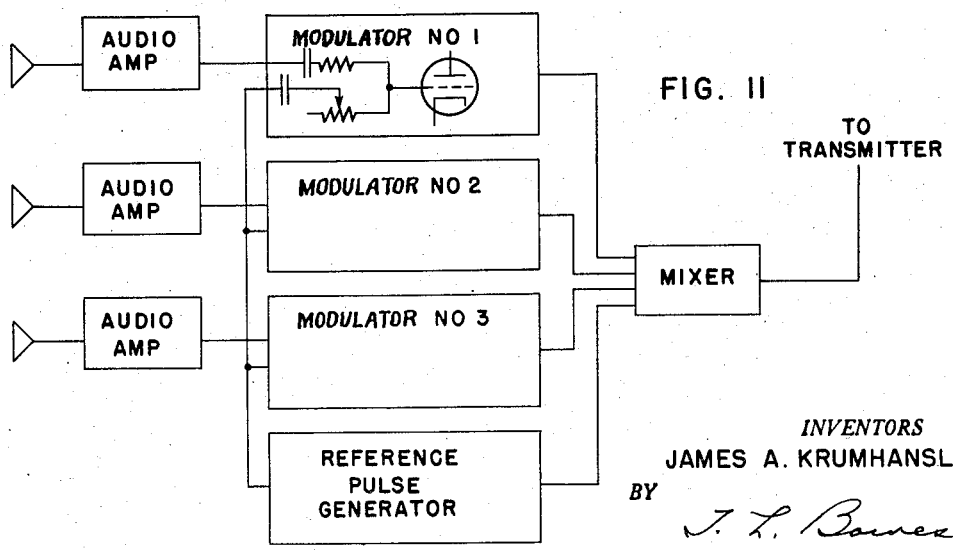
Figure 12:
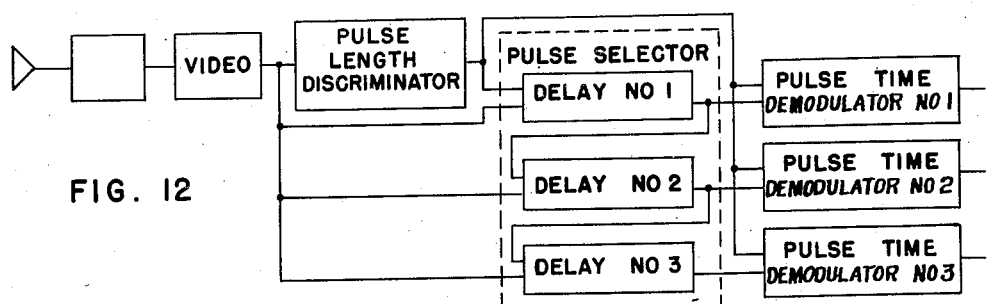
Figure 13:
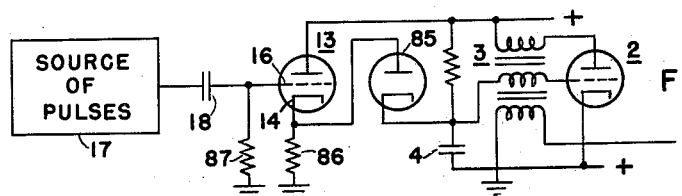
Figure 14:
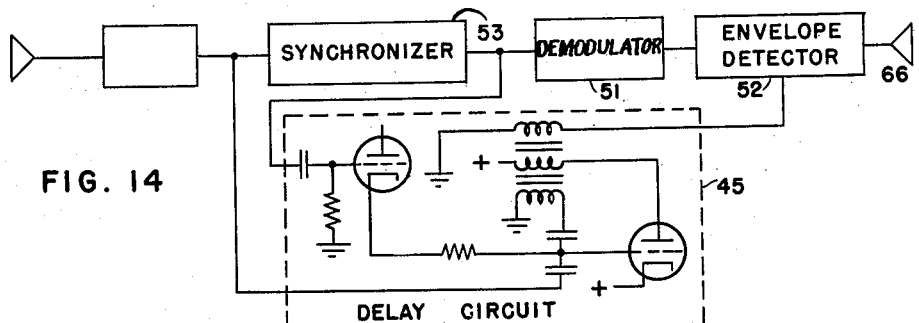
Figure 15:
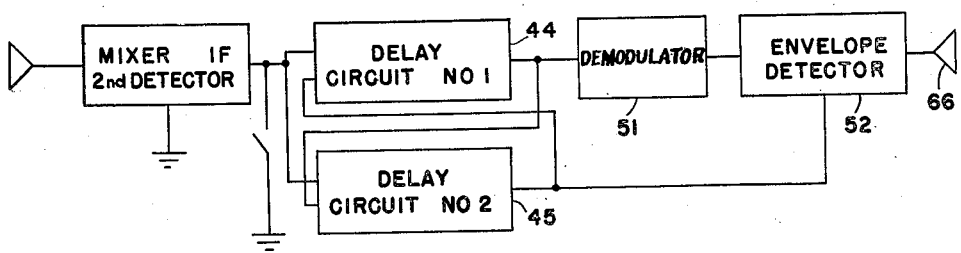

Further objects and advantages of this invention will become apparent from a reading of the following specification in connection with the drawings in which Fig. 1 is a schematic diagram of a pulse generator useful in practicing this invention, Fig. 2 is a chart useful to an understanding of the operation of the circuit of Fig. 1, Fig. 3 is a schematic diagram of a portion of a transmitting system utilizing the principles of my invention, Fig. 4 is a chart helpful in understanding the operation of the circuit of Fig. 3, Fig. 5 is a partial schematic diagram of receiving means to be used with the transmitting means of Fig. 3, Fig. 6 is a graph illustrating the operation of the circuits shown in Fig. 5, Figs. 7 and 8 represent transmitting and receiving means respectively for a single channel pulse communication system embodying the principles of this invention but in which no reference pulses are used, Figs. 9 and 10 illustrate a multi-channel pulse communication system following the principles of this invention, but in which no reference pulses are used, Figs. 11 and 12 depict transmitting and receiving means respectively for a multichannel communication system employing reference pulses, Fig. 13 is a modification of the delay circuit of Fig. 1, and Figs. 14 and 15 are modifications of the system shown in Fig. 5.

This invention utilizes time modulated pulses by which is meant that the spacing between successive pulses of a train of pulses is representative of the intelligence being transmitted. In order properly to time the occurrence of such pulses there is employed suitable coding or timing means. The operation of the pulse time modulator of this invention is probably best understood from a consideration of the delay circuit illustrated in Fig. 1 of the drawing which includes a blocking oscillator 1, having an electron discharge device such as a triode 2, a suitable transformer 3, a capacitor 4 and a resistor 5. The anode 6 of the discharge device 2 is connected to a suitable source of positive potential through one winding 7 of transformer 3. The cathode 8 of discharge device 2 is connected to a suitable source of positive potential in order to establish suitable bias for the discharge device (preferably approximately half of the potential of the anode supply voltage). The cathode 8 is also connected to one side of capacitor 4. The other side of capacitor 4 is connected to control electrode 9 of discharge device 2 through another winding 10 of transformer 3. The resistor 5 is connected between a suitable source of positive potential and the common connection between capacitor 4 and transformer winding 10. The third winding 11 of transformer 3 constitutes part of the output circuit of the blocking oscillator 1.

During periods of conduction through discharge device 2, capacitor 4 becomes charged to approximately the difference between the positive potential and the cathode potential with the upper side of capacitor 4 as viewed in Fig. 1 negative with respect to the cathode 8. When conduction through device 2 ceases, the potential at control electrode 9 is approximately zero, assuming that cathode 8 is connected to a source of potential approximately half that of the anode supply. Hence, the upper side of capacitor 4 is driven negative and about equal to approximately half that of the anode supply. Capacitor 4 charges exponentially through resistor 5 until the potential at control electrode 9 reaches the cut-off level and the discharge device 2 is again rendered conducting. The foregoing description of blocking oscillator operation produces the sawtooth wave shown in Fig. 2A.

The delay circuit of Fig. 1 also includes a control tube, such as triode 13, having a cathode 14 connected to the common connection between capacitor 4 and resistor 5, an anode 15 connected to a suitable source of positive potential and the control electrode 16 connected to a suitable source of input pulses 17 through suitable coupling means as, for example, capacitor 18. In the absence of input pulses, discharge device 13 is inoperative and the cathode 14 is positive with respect to the control electrode 16 of discharge device 13.

Input pulses, represented at Fig. 2B, render discharge device 13 conducting to impose a potential representing the potential of the input pulses on the capacitor 4 by cathode follower action. The appearance of the pulse thus modifies the charge on capacitor 4 by the amplitude of the peak pulse voltage. After the input pulse falls, capacitor 4 continues to charge exponentially. Referring to Fig. 2C, it is seen that capacitor 4 charges along the line 20 until an input pulse is received at which time the charge on capacitor 4 suddenly increases by the amount of the input pulse voltage. As explained above, after the pulse falls, capacitor 4 continues to charge at approximately the same rate as before as indicated by the line 20a of Fig. 2C until the charge reaches cut-off as indicated by the horizontal dashed line of Fig. 2C. At this time, the output pulse, shown at 21a of Fig. 2D, is produced.

If the amplitude of the input pulses is increased to the amount indicated by the dotted block surmounting one of the pulses in Fig. 2B, the charge on capacitor 4 is increased a proportionate amount by the appearance of each pulse so that after the pulse falls, the charging of capacitor 4 continues along the dashed line 20b instead of 20a. Obviously, the cut-off level is reached sooner than in the previously considered case and the corresponding output pulse is produced at the time indicated by the dotted pulse 21c in Fig. 2D. If the preceding pulse is indicated by the numeral 21a, it is seen that spacing between pulse 21a and pulses 21b and 21c is different. In other words, the blocking oscillator or pulse generator 1 produces an output pulse after a certain time delay following the receipt of any pulse and the amount of delay is determined by the length of time required for the potential on capacitor 4 to rise from the peak input pulse voltage to the firing potential of discharge device 2. The delay is independent of the potential existing before the pulse because the pulse potential is not added to the existing potential, but merely lifts the potential of capacitor 4 to the level of the maximum voltage of the input pulses.

Fig. 13 illustrates a modification of the delay circuit shown in Fig. 1 in which cathode 14 of discharge device 13 is grounded through resistor 86 and control electrode or grid 16 is connected to ground through resistor 87. Hence cathode 14 is at approximately grid potential. To enable capacitor 4 to be charged to a higher potential than that of cathode 14, a diode 85 is interposed between cathode 14 and the upper side of capacitor 4.

In Fig. 3, there is illustrated an adaptation of the delay circuit shown in Fig. 1 to a communication system. The same numerals used in Fig. 1 are used for corresponding parts. By impressing a potential corresponding to intelligence to be transmitted on the control device 13, in addition to pulses from a suitable pulse generator 28, the delay between successive pulses produced by pulse generator 1, can be made to depend upon the amplitude of the signal voltage at the instant at which the reference pulse is applied. The circuit of Fig. 3, therefore, produces pulse time modulation in which the signal voltage is sampled, i. e. utilized to operate the pulse generator or modulator, at intervals varying with the amplitude of the signal voltage.

The pulse time modulator 29 of Fig. 3 includes the delay circuit of Fig. 1. Resistors 30 and 31 are inserted between coupling capacitors 32 and 33, respectively, and control electrode 16. A suitable source of signal input, such as a microphone 34 is connected to capacitor 32 through a suitable audio amplifier 35. The reference pulses are applied through coupling capacitor 33. The function of the resistance means comprising resistors 30 and 31 is to impress desired proportions of the reference pulse and the input signal potentials on the control electrode 16. Obviously, resistors 30 and 31 may be a single resistor in which the voltage representing the intelligence is connected to one point thereof, the reference pulses are applied at another point thereof, and the control electrode 16 is connected intermediate the other connections. Moreover, the point of connection of control electrode 16 may be variable and the points of application of one or both of the input voltages may be adjustable in order to provide control of the voltage proportions.

Discharge device 13, of course, is rendered conductive whenever the potential on control electrode or grid 16 is above the cut-off level. For convenience, if $E_s$ represents the instantaneous potential of the signal voltage and $E_p$ represents the potential of the reference pulses, the proportions of $E_s$ and $E_p$ are chosen such that neither the maximum signal voltage $E_s$ nor the pulse voltage $E_p$ occurring alone causes conduction of device 13. Since $E_p$ is substantially constant, the rate of firing of discharge device 13 changes according to the frequency with which the sum of signal voltage and pulse voltage exceeds cut-off. If this sum is represented as $E_s+BE_p$, the delay in rendering conductive discharge device 2 depends upon the difference between the firing voltage and the sum of $E_s$ and $BE_p$. Since B, and $E_p$ are fixed, the amount of delay depends upon the amplitude of $E_s$ and the average delay may be changed by changing $E_p$, or B.

The system of Fig. 3 includes not only the pulse time modulator 29 and the source of reference pulses 28, but also a mixing circuit 21. The form of mixer illustrated in the present application comprises a pair of normally inoperative electron discharge devices 22 and 22a which may be triodes having anodes 23 and 23a, respectively, connected to a suitable source of positive potential, cathodes 24 and 24a, respectively, connected together and to one end of a suitable resistor 37, the other end of resistor 37 being grounded. The output of the pulse time modulator 29 is impressed upon the control electrode 25 of discharge device 22 and the output of reference pulse generator 28 is applied not only to the pulse time modulator 29, but also to the control electrode 26a of discharge device 22a. The resistor 37 constitutes a common load means or device for both discharge devices and in the illustrated form of my invention is connected as a cathode follower. The pulses appearing across resistor 37 are conducted to the remaining parts of the transmitting system, not shown.

In order to obtain faithful reproduction of signals, it is desired that the repetition rate of the reference pulses be relatively great. Inasmuch as modulating is a form of sampling process in which the signal voltage is sampled at intervals, more faithful reproduction will be obtained if a large number of samplings is made. However, this invention is useful even though the repetition rate of reference pulses is as low as one reference pulse for each half cycle of the input signal voltage. The amplitude of the reference pulses should be at least equal to the difference between the maximum positive signal voltages and the maximum negative signal voltages.

Fig. 4 illustrates operation of the coder 29 of Fig. 3. At Fig. 4A there are represented reference pulses. At Fig. 4B there is represented a typical input audio or signal voltage. At C of Fig. 4 there is depicted the variations in charge of capacitor 4 and hence the change of potential at control electrode 9 of discharge device 2. Finally, at Fig. 4D there are shown the output pulses from the coder which occur whenever the control electrode potential of device 2 reaches cut-off as represented by the dashed line in Fig. 4C.

A suitable system for receiving and reproducing the time modulated pulses emitted by a transmitting system utilizing the coder shown in Fig. 3 is illustrated in Fig. 5. The signals may be received on a suitable antenna 41 and after being passed through suitable mixing and I. F. circuits represented by the numeral 42 and a suitable second detector and amplifier represented by the numeral 43, the pulses are impressed on suitable pulse selectors such as the two delay circuits 44 and 45 for separating reference and signal pulses. The details of these delay circuits form no part of the present invention but are illustrated, described and claimed in co-pending U. S. application of James A. Krumhansl and Glenn H. Miller, Serial No. 673,005, filed May 29, 1946, and assigned to the same assignee as the invention described and claimed herein. Inasmuch as the operation of the two delay circuits is the same, reference will be made to only one of the delay circuits.

Delay circuit 44 comprises a blocking oscillator 46 including discharge device 47, suitable transformer 48 and capacitor 49. As explained in the above identified co-pending application, the blocking oscillator 46 produces an output pulse on the appearance of the next signal pulse following the receipt of a reference pulse at the control electrode of a unilateral device, such as the triode 50. Both signal and reference pulses transmitted and received on antenna 41 are impressed upon capacitors 49 in delay circuits 44 and 45. The blocking oscillators are not rendered operative, however, because the amplitude of the received pulses alone in insufficient to overcome the positive bias of discharge devices 47. Moreover, the received pulses are coupled to the control electrode of discharge devices 47 from a low impedance source, such as the output transformer winding 51 in the amplifier represented by the numeral 43, so that any charge on capacitors 49 follows closely the incoming pulses. At other predetermined times, however, reference pulses are impressed upon capacitors 49 and the control electrode of discharge devices 47 through the unilateral devices 50 which serve to charge the capacitors 49 to a predetermined level. The charge applied to capacitors 49 through the unilateral devices 50 remains on capacitors 49 because no discharge path is provided. Hence, if the predetermined level is correctly chosen, the next signal pulse fires the discharge device 47 to produce an output pulse.

In considering the operation of the delay circuits in the receiving means of Fig. 5, let it be assumed that the various power supplies are connected. Minute differences in the wiring and tube characteristics, for example, will cause one of the discharge devices 47 to become conductive. Output pulses of the first delay circuit 44 are impressed only on pulse time demodulator 51, whereas the output pulses from the second delay circuit 45 are impressed upon envelope detector 52 and also delay circuit 44. Hence output pulses of delay circuit 45 constitute reference pulses for the first delay circuit 44.

It will also be observed that the input pulses are applied not only to capacitors 49 in each delay circuit but also to synchronizing means 53. Pulses appearing in the output of the synchronizing circuit 53 are applied as reference pulses to the second delay circuit 45. Thus, transmitted reference pulses determine the times of operation of the second delay circuit 45.

The synchronizing circuit 53 is provided in order to synchronize the operation of the delay circuits so that signal pulses and not reference pulses will be passed through the receiving system for reproduction. Synchronizing may be accomplished simply by causing reference pulses to have a different characteristic from the intelligence carrying pulses. For example, pulses of a predetermined length may be produced in the reference pulse generator 28 of Fig. 3 and a pulse length discriminator may be utilized as the synchronizing means 53, so that only pulses of the predetermined characteristic, i. e., length or time duration in the assumed example, will energize the second delay circuit 45. Suitable pulse length discriminators are shown, described, and claimed in co-pending application of James A. Krumhansl, Serial No. 672,388, filed May 27, 1946, and co-pending application of James A. Krumhansl and Glenn H. Miller, Serial No. 657,174, filed March 26, 1946, now Patent No. 2,484,352, granted October 11, 1949, both assigned to the same assignee as the invention described and claimed in the present application.

The pulse time demodulator 51 may comprise a discharge device, such as a triode 54 having an anode 55 connected to a suitable source of positive potential, a cathode 56 connected to ground through an R—C network including resistor 57 and electrical storage means, such as capacitor 58, connected in shunt and having values of resistance and capacitance to provide a time constant approximately equal to that of the modulator. The output pulses from delay circuit 44 are impressed upon the control electrode 59 of discharge device 54 and render conductive the discharge device 54 to charge capacitor 58. Between successive pulses the charge leaks off capacitor 58. This operation is illustrated in Fig. 6 in which the curve 60a represents the variation in charge of capacitor 58. Thus, a maximum charge is reached and then discharge takes place exponentially until the next operation of discharge device 54 again lifts the charge to its maximum value.

In order to separate the envelope from the sawtooth wave, there is provided an envelope detector 52 including a pair of discharge devices, such as triodes 62 and 63, the anodes and cathodes being inversely connected and the control electrodes being connected together. The voltage appearing across the R—C network 57, 58 is applied to one anode-cathode connection and the output of the second delay circuit 45 is connected to the control electrodes of devices 62 and 63. A second electrical storage device such as capacitor 64 is connected between the other anode-cathode connection of devices 62 and 63 and ground, so that whenever either device 62 or 63 conducts, the charge appearing across capacitor 58 is transferred to capacitor 64. The voltages appearing across capacitor 64 are passed through a suitable audio amplifier 65 and reproduced by suitable reproducing means such as a loud speaker 66. In order to prevent the discharge of capacitor 64 between pulses, the capacitor 64 is connected to the audio amplifier 65 through a suitable high impedance device, such as an electron discharge device 67 connected as a cathode follower. The details of the pulse time demodulator and envelope detector which cooperate to reproduce the original intelligence as herewith described are shown, described, and claimed in co-pending application of James A. Krumhansl and Harold Goldberg, Serial No. 646,616, filed February 9, 1946, now Patent No. 2,467,486, granted April 19, 1949, and assigned to the same assignee as the invention described and claimed herein.

Thus, output pulses from relay circuit 45 are used to transfer the charge from capacitor 58 to capacitor 64 by rendering conductive either discharge device 62 or 63, depending upon the relative potentials across capacitors 58 and 64 at that time. At the same time, the output pulses from delay circuit 45 are impressed upon the first delay circuit 44 to render conductive discharge device 50 associated therewith to prepare the blocking oscillator 46 for operation upon receipt of the next reference pulse. Upon receipt of the next reference pulse, discharge device 47 in delay circuit 44 is rendered operative and a pulse corresponding in time is applied to the pulse time demodulator to recharge capacitor 58. The receipt of the reference pulse in delay circuit 45 prepares delay circuit 45 for operation. Then, completing the cycle, receipt of the next signal pulse triggers delay circuit 45 to again transfer the charge from capacitor 58 to capacitor 64 and prepares delay circuit 44 for operation. This sequence is illustrated in Fig. 6 wherein, at A, there are represented reference pulses 60 and signal pulses 61. Referring to Fig. 6B, receipt of reference pulses causes charge and discharge of capacitor 58 as indicated by curve 60a. At the times of receipt of signal pulses 61, the potential on capacitor 58 which is transferred to capacitor 64 is indicated by points 60b, c, d, and e. The potential at capacitor 64 follows the dashed line 61a, i. e., follows the samplings made of the recurring voltage 60a by the envelope detector. The original signal approximated by the curve 61a, is represented by curve 61b. By using a sufficiently great repetition rate, the approximation is quite close.

In Fig. 14, there is illustrated a modification of the receiving system illustrated in Fig. 5, in which only one delay circuit is employed and the synchronizing circuit 53 is substituted for delay circuit 44. In this arrangement, reference pulses pass through the synchronizer 53 and not only prepare delay circuit 45 for operation but also charge the capacitor in demodulator 51 as previously described. Upon receipt of the next pulse, which is a signal pulse, the delay circuit 45 is triggered. The output pulse from delay circuit 45 operates envelope detector 52 to sample the charge on the capacitor in demodulator 51.

Reference to Fig. 6 suggests that instead of utilizing the reference pulses to operate the demodulator, and signal pulses to sample the condition of the demodulator, it should be possible to reverse functions of the delay circuits of Fig. 5. With reference pulses of constant repetition rate, it should be immaterial whether the difference in time of occurrence of signal pulses is related to the preceding or the following reference pulses, so long as the straight line portion of curve 60a of Fig. 6B is followed. Thus, the circuit of Fig. 5 may be modified to accomplish this result by reversing the input leads to delay circuits 44 and 45. With such an arrangement, referring to Fig. 6A, the time periods $t_2$ instead of time periods $t_1$ are employed. In Fig. 6C, there is illustrated the operation of the modified circuit. The same output curve is obtained but the instantaneous polarity is reversed as compared to the audio curve 61b of Fig. 6B.

In Fig. 15, another variation of the circuit of Fig. 5 is illustrated. In this arrangement, only one demodulator and one envelope detector are used and the synchronizing circuit is eliminated. With this arrangement, there need be no distinguishing characteristic between reference pulses and signal pulses. By reason of circuit and tube differences, one of the delay circuits will operate first and thereafter this circuit operates on every other pulse and the other delay circuit operates on the intermediate received pulses. The output of one delay circuit controls operation of the decoder and the output of the other delay circuit controls operation of the envelope detector. The outputs of the delay circuits also serve as reference or "preparing" pulses for the other delay circuit. Selection of the signal to be reproduced may be made in any desired fashion. A simple arrangement is merely to short circuit momentarily the amplifier following the second detector and repeat the operation until the envelope detector and demodulator are energized, respectively, by the proper series of pulses. This operation may be performed by switch means across the output of the amplifier.

Figs. 7 and 8 disclose, respectively, transmitting and receiving means utilizing the pulse time demodulator 29 of Fig. 3 and pulse time demodulator 51 and envelope detector 25 of Fig. 5. However, the circuits are simplified by the elimination of reference pulses. In order to obtain a voltage to serve the same purpose as the reference pulses of the circuit of Fig. 3, the output pulses of the modulator 29 are caused to be impressed on a suitable delay circuit 70 and the output pulses from the delay circuit 70 are utilized as reference pulses. The delay circuit may comprise an artificial transmission line or a delay multi-vibrator, for example. A similar delay circuit must be used in the receiving system as shown in Fig. 8 in order to withhold conduction through the demodulator until after the transfer of charge from capacitor 58 of the demodulator 51 to capacitor 64 of envelope detector 52.

Figs. 9 and 10 illustrate a different embodiment in which the principles of this invention are utilized to provide a multi-channel system without reference pulses. There is provided a modulator for each input source of signal voltage. Instead of reference pulses, the output of each modulator is utilized as the reference pulse for the next modulator in succession. Referring to Fig. 9, there is illustrated a four channel system embodying modulators 71, 72, 73 and 74. Each modulator has a separate signal input circuit as for example, microphones 75, 76, 77 and 78 and suitable amplifiers. Inasmuch as the output of each modulator serves as a reference pulse for the next modulator, the various modulators will be rendered operative in succession and hence, successive spaced pulses will be transmitted after passage through the mixer 79 which is the same in principle as mixer 21 of Fig. 3 except that four electron discharge devices are employed instead of the two shown in Fig. 3. As a result, there will be transmitted groups of time modulated pulses on a single band of frequencies and successive pulses in each group will represent a different signal source.

In Fig. 10, there is illustrated a receiving system adapted to select and demodulate the signals emitted by the transmitting means of Fig. 9. The multi-channel selector system comprises a delay circuit, a demodulator and an envelope detector for each channel. The components of each channel are the same as those described in connection with Fig. 5. Inasmuch as selection of a desired one of the four signals transmitted is desired, synchronizing means may be provided. For example one modulator may be arranged to produce pulses of a predetermined length and a pulse length discriminator 80 may be included in the input circuit to the corresponding selector circuit. Thus, if modulator No. 2 of Fig. 9 is thus arranged, the pulse length discriminator 80 of Fig. 10 would be associated with delay circuit No. 2 of Fig. 10.

In order to illustrate operation of the circuit of Fig. 10, let it be assumed that there is received a signal pulse corresponding to channel 2. The pulse length discriminator 80 passes this pulse to prepare the channel 2 delay circuit for operation and also operates demodulator No. 2 to charge the capacitor associated therewith. The receipt of the signal pulse corresponding to channel 3 triggers channel delay circuit 2. The output of delay circuit 2 conditions the delay circuit of channel 3 for operation and also operates the envelope detector associated with channel 2 to transfer the charge now remaining from the pulse corresponding to channel 2. Furthermore, the output signals from delay circuit 2 cause operation of the demodulator associated with channel 3. Thus, receipt of a signal pulse representing channel 3 triggers delay circuit 2, charges demodulator 3 and prepares delay circuit 3 for operation upon receipt of the pulse corresponding to channel 4. Similarly, receipt of the pulse corresponding to channel 4 triggers delay circuit 3, charges the demodulator associated with channel 4 and prepares delay circuit 4 for operation. These steps proceed until delay circuit 1 is operated. At this point, it is noted that the output of delay circuit 1 is connected only to the envelope detector associated with channel 1, because incoming pulses of a predetermined length serve as reference pulses for delay circuit 2 and to charge the demodulator for channel 2.

In Figs. 11 and 12, there are shown transmitting and receiving systems respectively for a four-channel system in which three channels carry signals representing intelligence to be transmitted and the fourth channel carries reference pulses of a predetermined pulse length. In this embodiment of the invention each modulator of Fig. 11 is adjusted by varying the amount of reference pulse voltage applied to the associated discharge device 13 as indicated by the different settings of the resistors 30 and 31. The various adjustable resistors will be set so that the average delay will not result in overlapping of pulses in the mixer.

In view of the previous description, it is believed unnecessary to describe Fig. 12 other than to point out that three delay circuits and three demodulator and envelope detector circuits are required and that the output of the pulse length discriminator which passes only the reference pulses, charges all of the demodulators and serves as the reference pulse for the relay circuit corresponding to channel 1. The output of the delay circuit is utilized to prepare the next delay circuit for action and to transfer the charge from the demodulator to the envelope detector, as described previously.

Modifications of my invention will occur to those skilled in the art. For example, the receiving system of Fig. 10 may be modified to provide only one reproducing means, and counting means may be used to select one output from the plurality of demodulators, thereby to enable the user to select any one signal for reproduction. Again, referring to Fig. 15, a dividing circuit of known type, arranged to divide by a factor of two may be substituted for the synchronizer of Fig. 14.

The receiving system including the delay, demodulating, and enveloping detecting circuits is shown, described and claimed in the co-pending application of James A. Krumhansl and Glenn H. Miller, Serial No. 686,140 filed July 25, 1946, and assigned to the same assignee as the present invention.

What I claim is:

1. In a system of pulse communication, a plurality of sources of signal voltage, an independent pulse generator associated with each of said sources, means for causing output pulses to be generated by each of said generators at intervals dependent upon the signal voltage from the associated source, means for mixing the outputs of said generators comprising a normally inoperative electron discharge device for each generator, each of said devices having a control electrode, an anode and a cathode, a common loading means for said devices, means for impressing the generator output pulses on the control electrodes of the corresponding discharge devices to render said corresponding discharge devices conductive, and means for impressing the output pulse of each generator on the input circuit of another generator whereby said generators operate successively to produce pulses across said common loading means.

2. In a pulse communication system, a pair of independent pulse generators, means for mixing the outputs of said generators comprising an electron discharge device for each generator, said discharge devices each having a control electrode, an anode, and a cathode, common output means for said discharge devices, means for impressing the output of each generator on the control electrode of the associated discharge device in order to render conductive said associated discharge device to produce a pulse, and means utilizing the pulse produced by one generator to render operative the other generator so that said generators operate in succession, the pulses produced by one of said generators being a different length than those produced by the other generator.

3. In combination, a source of input pulses, means utilizing said pulses for producing output pulses of substantially uniform width after a predetermined time delay, said means comprising a source of recurring voltage which normally varies periodically with respect to time including a capacitor, means for charging said capacitor, means for discharging said capacitor when a predetermined charge is reached, and means for modifying the charge of said capacitor to vary the time required to reach said predetermined charge whereby there are produced output pulses delayed in time with respect to the input pulses by an amount which is a function of the amplitude of said input pulses.

4. In combination, a blocking oscillator comprising a capacitor and an electron discharge device including an anode, a cathode, and a control electrode, said capacitor being connected in the cathode-to-control electrode circuit of said device, said oscillator having a predetermined time constant, means for charging said capacitor when said discharge device is non-conductive, said cathode being biased positively with respect to said control electrode whereby said discharge device is rendered conductive periodically to reduce the charge on said capacitor until said discharge device becomes non-conducting, said discharge device remaining non-conducting until sufficient charge has accumulated on said capacitor to raise the potential at the control electrode to the cut-off level, said oscillator being arranged to produce an output pulse whenever said device is rendered conductive, a source of input pulses, and means utilizing said input pulses for modifying the charge between said output pulses for varying the time interval between successive output pulses.

5. In combination, a blocking oscillator comprising a capacitor and an electron discharge device including an anode, a cathode and a control electrode, said capacitor being connected in the cathode-anode circuit of said discharge device, said oscillator having a predetermined time constant, means for charging said capacitor when said device is non-conductive, said cathode being biased positively with respect to said control electrode whereby said device is rendered conductive periodically to reduce the charge on said capacitor to a potential sufficiently negative to render non-conductive said device until sufficient charge has been restored to said capacitor to raise the control electrode potential to the cut-off level, said oscillator being arranged to produce an output pulse whenever said device is rendered conductive, a second discharge device, having an anode, a cathode, and a control electrode, resistance means, a source of voltage representing intelligence to be transmitted connected to said resistance means at one point thereof, a source of reference pulses connected to said resistance means at another point thereof, the control electrode of said second device being connected to said resistance means intermediate the other connections, and means for impressing the potential of the cathode of said second device on said capacitor to modify the charge thereof, whereby output pulses are produced at times varying with the amplitude of said voltage.

6. In combination, a blocking oscillator comprising a capacitor and an electron discharge device having an anode, a cathode, and a control electrode, said capacitor being connected in the anode-cathode circuit of said discharge device, said oscillator having a predetermined time constant, means for charging said capacitor when said device is non-conductive, said cathode being biased positively with respect to said control electrode whereby said device is rendered conductive periodically to reduce the charge on said capacitor to a potential sufficiently negative to render non-conductive said device until sufficient charge has been restored to said capacitor to raise the potential of the control electrode to the cut-off level, said oscillator being arranged to produce an output pulse whenever said device is rendered conductive, a second discharge device having an anode, a cathode and a control electrode, resistance means, a source of voltage representing intelligence to be transmitted connected to said resistance means, a source of reference pulses connected to another point on said resistance means, the control electrode of said second discharge device being connected intermediate said other connections, and means for utilizing the cathode potential of said second device to modify the charge on said capacitor, there being supplied at least one reference pulse during each half-cycle of said intelligence representing voltage.

7. In combination, a blocking oscillator comprising a capacitor and an electron discharge device having an anode, a cathode, and a control electrode, said capacitor being connected in the anode-cathode circuit of said discharge device, said oscillator having a predetermined time constant, means for charging said capacitor when said device is non-conductive, said cathode being biased positively with respect to said control electrode whereby said device is rendered conductive periodically to reduce the charge on said capacitor to a potential sufficiently negative to render non-conductive said device until sufficient charge has been restored to said capacitor to raise the potential of the control electrode to the cut-off level, said oscillator being arranged to produce an output pulse whenever said device is rendered conductive, a second discharge device having an anode, a cathode and a control electrode, resistance means, a source of voltage representing intelligence to be transmitted connected to said resistance means, a source of reference pulses connected to another point of said resistance means, the control electrode of said second discharge device being connected intermediate said other connections, and means utilizing the cathode potential of said second device to modify the charge on said capacitor, the amplitude of the reference pulses being equal to at least the difference between the maximum positive and maximum negative values of the signal voltage.

8. In combination, a blocking oscillator comprising an electron discharge device having an anode, a cathode, and a control electrode, a capacitor connected in the anode-cathode circuit of said discharge device, said oscillator having a predetermined time constant, means for charging said capacitor when said device is non-conductive, said cathode being biased positively with respect to said control electrode whereby said device is rendered conductive periodically to reduce the charge on said capacitor to a potential sufficiently negative to render non-conductive said device until sufficient charge has been restored to said capacitor to raise the potential of the control electrode to the cut-off level, said oscillator being arranged to produce an output pulse whenever said device is rendered conductive, a second discharge device having an anode, a cathode and a control electrode, resistance means, a source of voltage representing intelligence to be transmitted connected to said resistance means, a source of reference pulses connected to another point on said resistance means, the control electrode of said second discharge device being connected intermediate said other connections, and means utilizing the cathode potential of said second device for modifying the charge on said capacitor, and means for varying the proportions of signal and reference pulse voltage applied to the control electrode of said second discharge device.

JAMES A. KRUMHANSL.

REFERENCES CITED

The following references are of record in the file of this patent:

UNITED STATES PATENTS

| Number | Name | Date |
|---|---|---|
| 2,048,081 | Riggs | July 21, 1936 |
| 2,199,634 | Koch | May 7, 1940 |
| 2,227,596 | Luck | Jan. 7, 1941 |
| 2,395,467 | Deloraine | Feb. 26, 1946 |
| 2,398,097 | Kent | Apr. 9, 1946 |
| 2,403,210 | Butement | July 2, 1946 |
| 2,408,077 | Labin | Sept. 24, 1946 |
| 2,432,204 | Miller | Dec. 9, 1947 |

Certificate of Correction

Patent No. 2,497,411 — February 14, 1950

JAMES A. KRUMHANSL

It is hereby certified that errors appear in the printed specification of the above numbered patent requiring correction as follows:

Column 7, line 52, for the word "relay" read *delay*; column 8, line 72, for "demodulator 29" read *modulator 29*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*